Nov. 5, 1963

B. A. WIKSTROM 3,109,581

EJECTOR DEVICES

Filed April 18, 1960

2 Sheets-Sheet 1

INVENTOR
BERTH ATLE WIKSTROM

BY Stevens, Davis, Miller & Mosher

ATTORNEYS

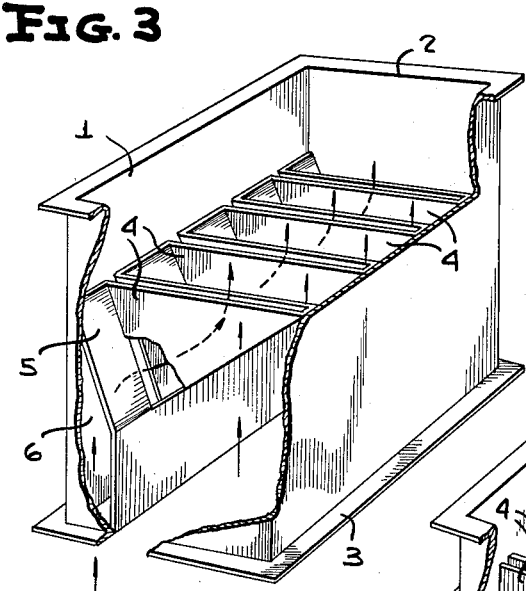
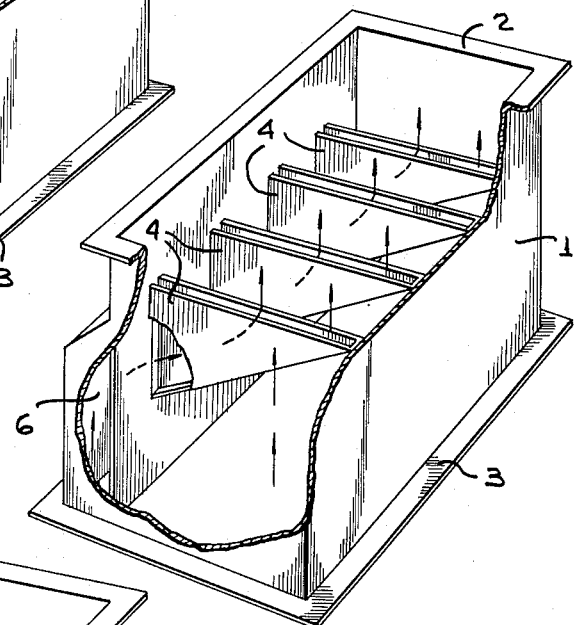
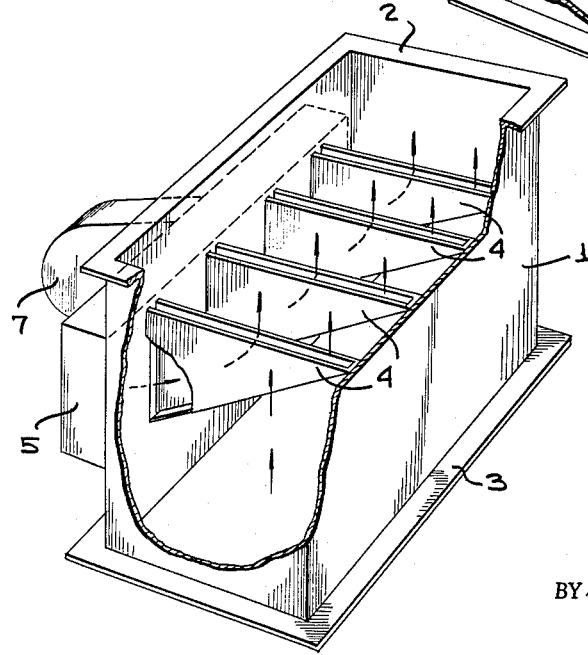

United States Patent Office 3,109,581
Patented Nov. 5, 1963

3,109,581
EJECTOR DEVICES
Berth Atle Wikstrom, Enkoping, Sweden, assignor to Aktiebolaget Bahco, Stockholm, Sweden, a corporation of Sweden
Filed Apr. 18, 1960, Ser. No. 22,749
1 Claim. (Cl. 230—103)

The present invention relates to an ejector device for gaseous media.

Hitherto known ejector devices usually consist of a conduit of circular cross-section for conducting the driven medium and a conduit for the driving medium opening coaxially into the first-mentioned conduit. Such ejector devices have the disadvantage that the driving medium obtains its full action only in the center of the conduit, while the effect of the walls of the conduit is comparatively inferior, and in addition the conduit for the driving medium must partly extend perpendicularly to the direction of flow of the air stream and therefore gives rise to undesirable turbulence which adversely affects the action of the ejector device. If the conduit for the driven medium, as is often the case, for instance, in the ventilation field, has a rectangular or square cross-section, the disadvantages mentioned above will be even more pronounced and above all the action of the driving medium at the angles of the conduit will be more or less nonexistent.

The object of the present invention is to provide an ejector device which is particularly suitable for conduits of rectangular or square cross-section and which is free from the disadvantages mentioned above. The ejector device according to this invention comprises a casing having rectangular or square cross-section and adapted to be connected to a conduit, and two or more flat ejector nozzles for the driving medium which extend across the width or length of the casing and which are arranged parallel to the direction of flow of the medium.

At one or both sides of the casing these ejector nozzles are connected to a manifold communicating with the source of driving medium and serving to distribute the driving medium uniformly to the nozzles.

The invention will be described more in detail below with reference to the embodiments thereof shown on the accompanying drawings.

Figure 1:
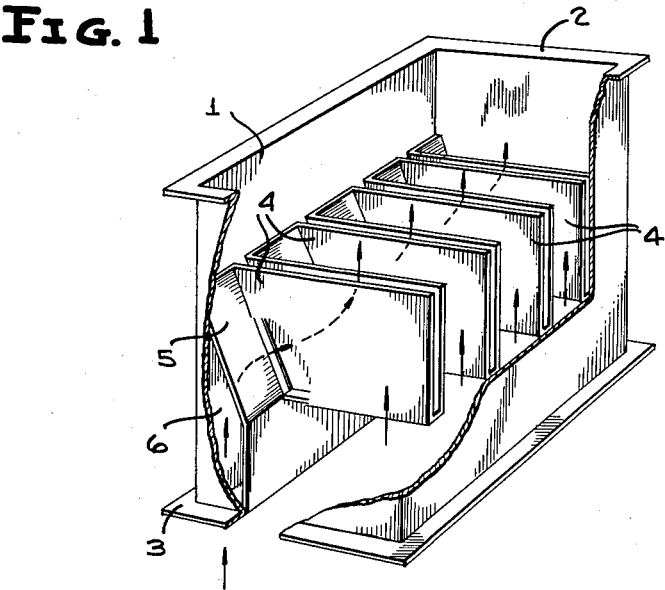

FIGURE 1 shows in perspective and with parts broken away a first embodiment of the ejector device according to the invention, while FIGURES 2-5 in a similar way illustrate four additional embodiments.

Referring to FIGURE 1, the numeral 1 denotes an ejector casing having rectangular cross-section and being provided with flanges 2 and 3 for connection to or incorporation in a conduit of the corresponding cross-section through which a gaseous medium, for example, air, flows.

Situated in the casing are a number of, in the present case four, flat ejector nozzles 4 for the driving medium which extend across the casing and open upwards. One side of these nozzles is connected to a manifold 6 formed by a wall 5 extending along one of the longitudinal sides of the casing, that manifold being connected to the source of driving medium (not shown).

Figure 2:
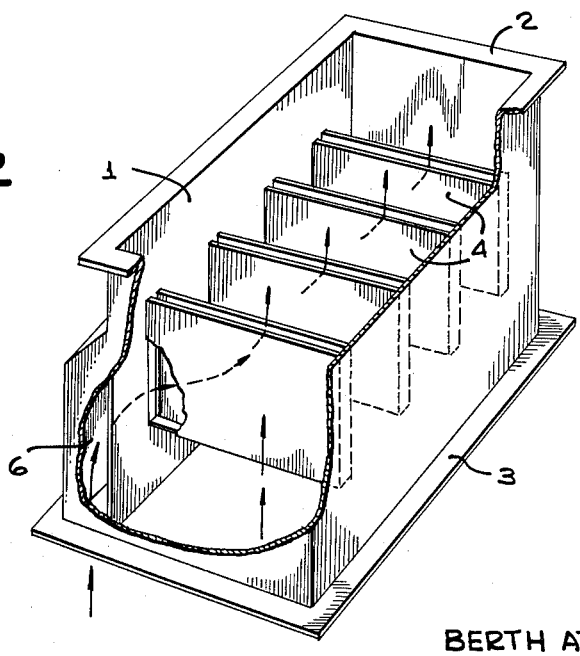

The embodiment according to FIGURE 2 differs from that described above only in that the manifold 6, with which the nozzles 4 communicate, is provided outside of the casing 1 so that the cross-section of the casing is equal at both ends thereof.

In the embodiments of FIGURES 3 and 4, which correspond substantially to those of FIGURES 1 and 2, respectively, there is only the difference that the flat ejector nozzles have a height which decreases from the manifold, whereby a more uniform distribution of the issuing driving medium is obtained.

The embodiment according to FIGURE 5 differs from that of FIGURE 4 in that the manifold 6 is directly connected to and supports a fan 7 for generating the flow of driving medium.

Of course, the invention is not restricted to the embodiments shown and described, but these can be varied in many ways without departing from the spirit and scope of the invention. Thus, for example, the ejector nozzles may communicate with manifolds provided on opposite sides of the casing, whereby the distribution of the driving medium can be further improved.

I claim:

An ejector device in which a fluid medium is driven comprising a rectangular casing adapted to be connected to a conduit and having a pair of opposing walls, the fluid medium having a direction of flow substantially parallel to said walls, a plurality of flat ejector nozzles through which a driving medium passes, said ejector nozzles extending transversely the entire distance between the opposing walls and arranged parallel to each other and to the direction of flow of the fluid medium, a manifold extending along one of the walls in communication with the driving medium and means for connecting the nozzles with the manifold so that said driving medium is directed from said manifold into said nozzles, said nozzles each having a side in fluid communication with said manifold and an upwardly sloping base extending from said side toward the other of said walls, each of said nozzles having rectangular slit-like cross-sections lying in planes perpendicular to the direction of flow of the fluid medium throughout the vertical extent of said nozzles whereby said driving medium passes uniformly through said ejector nozzles and entrains the fluid medium.

References Cited in the file of this patent
UNITED STATES PATENTS

| | | |
|---|---|---|
| 44,533 | Jasper | Oct. 4, 1864 |
| 191,438 | Jones | May 29, 1877 |
| 467,427 | McClave | Jan. 19, 1892 |
| 2,012,179 | Ashley | Aug. 20, 1935 |
| 2,339,629 | Fischer | Jan. 18, 1944 |